No. 704,073. Patented July 8, 1902.
J. G. MOLE.
CLOTHES LINE PROP HEAD.
(Application filed Mar. 10, 1902.)
(No Model.)
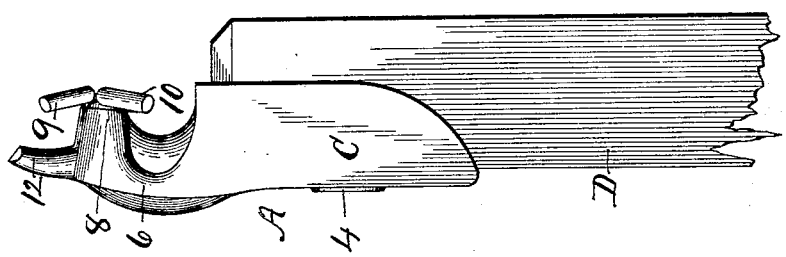
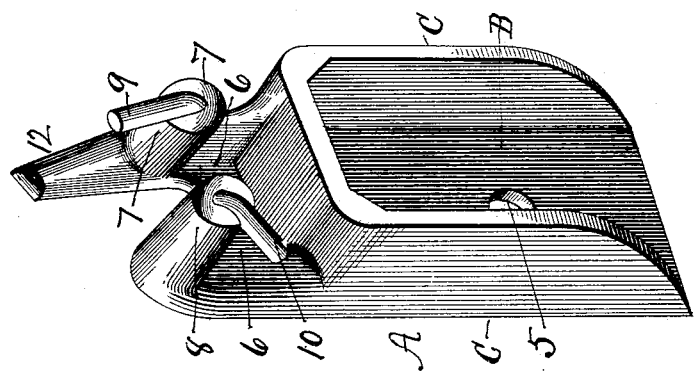
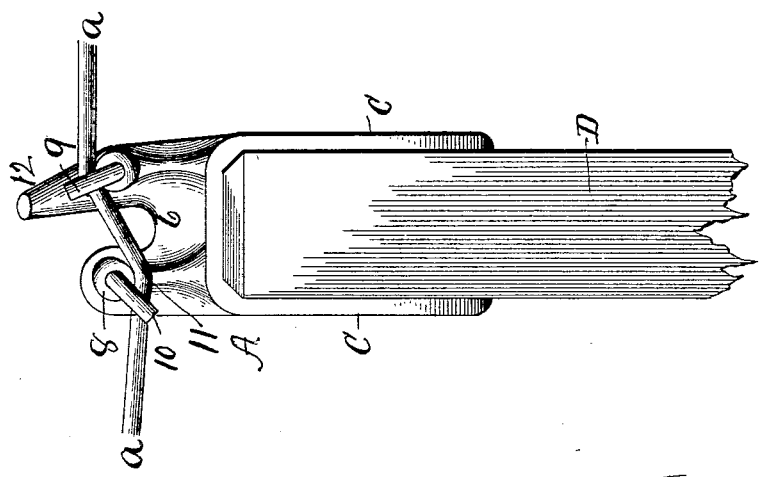
Witnesses:
Inventor:
J. G. Mole.
By L. B. Coupland & Co
Attys.
THE NORRIS PETERS CO., PHOTO-LITHO., WASHINGTON, D. C.

UNITED STATES PATENT OFFICE.

JOHN G. MOLE, OF BATAVIA, ILLINOIS.

CLOTHES-LINE PROP-HEAD.

SPECIFICATION forming part of Letters Patent No. 704,073, dated July 8, 1902.

Application filed March 10, 1902. Serial No. 97,623. (No model.)

*To all whom it may concern:*

Be it known that I, JOHN G. MOLE, a citizen of the United States, residing at Batavia, in the county of Kane and State of Illinois, have invented certain new and useful Improvements in Clothes-Line Prop-Heads; and I do hereby declare the following to be a full, clear, and exact description of the invention, such as will enable others skilled in the art to which it appertains to make and use the same.

This invention relates to a clothes-line prop-head for supporting the line at any point between the respective ends thereof, and has for its object to provide a device of this character that when placed in a supporting position will be so securely locked in engagement with the line that it cannot ordinarily be accidentally displaced.

In the drawings, Figure 1 is an elevation of a device embodying the improved features. Fig. 2 is a side elevation of the same; and Fig. 3 is a view in perspective of the prop-head.

A represents a prop-head, which will usually be composed of metal and cast in the desired form. The body part C of this head is provided with a socket-chamber B for the insertion of the upper end of a prop or staff D, to which the head is firmly secured by any suitable means, such as a screw 4, inserted through an aperture 5 into the prop. The head is provided with a vertical lug 6, having a horizontal binding-pin 7 and a companion horizontal binding-pin 8, set some distance apart, as shown. The pin 7 is provided in the end with an upturned hook 9, and the pin 8 with a hook 10, inclining downward. The relative inclination of these hooks may be varied from that shown, the object being to so incline them as to retain a sure locking grip on the line *a* and at the same time permit of the device being readily engaged and disengaged. When the head is in its engaged position, the line runs over the top of pin 7 and is deflected to pass under pin 8 and form a kink 11 in the line, as shown in Fig. 1. This provides for a clamping grip between the prop-head and line, so that they cannot be accidentally disengaged, thus avoiding a possibility of the prop being displaced and the line with its load dropped into the dirt, with the usual attending results. The upward extension 12 of the head and the hook in line therewith prevents a lateral movement of the line from its engaged position.

This device is more especially intended for use on wire or metal clothes-lines, but can be used with the ordinary cord line as well.

Having thus described my invention, what I claim as new, and desire to secure by Letters Patent, is—

1. A prop-head for clothes-lines, comprising a hollow body part, having a vertical lug provided with companion horizontal binding-pins projecting in the same direction from one side thereof and adapted to grip the line, and the retaining-hooks inclining in opposite directions, substantially as set forth.

2. The combination with a prop-head, comprising a hollow body part provided with a vertical lug extension and horizontal binding-pins having hooks set at different angles, of a prop on which said head is mounted, and means for securing said head in its mounted position, substantially as set forth.

In testimony whereof I affix my signature in presence of two witnesses.

JOHN G. MOLE.

Witnesses:
L. M. FREEMAN,
L. B. COUPLAND.